US011759382B2

(12) United States Patent
Dörfler et al.

(10) Patent No.: US 11,759,382 B2
(45) Date of Patent: Sep. 19, 2023

(54) AIR CUSHION ARRANGEMENT FOR A SEAT, FOR EXAMPLE A VEHICLE SEAT (71) Applicant: ALFMEIER PRÄZISION SE, Treuchtlingen (DE)

(72) Inventors: Erich Dörfler, Landsberg (DE); Helmut Auernhammer, Höttingen (DE); Jürgen Baumgartl, Treuchtlingen (DE); Michael Scherb, Arberg (DE)

(73) Assignee: ALFMEIER PRÄZISION SE, Treuchtlingen (DE)

( * ) Notice: Subject to any disclaimer, the term of this patent is extended or adjusted under 35 U.S.C. 154(b) by 7 days.

(21) Appl. No.: 17/612,708

(22) PCT Filed: Mar. 24, 2020

(86) PCT No.: PCT/EP2020/058065
§ 371 (c)(1),
(2) Date: Nov. 19, 2021

(87) PCT Pub. No.: WO2020/233868
PCT Pub. Date: Nov. 26, 2020

(65) Prior Publication Data
US 2022/0274517 A1 Sep. 1, 2022

(30) Foreign Application Priority Data
May 22, 2019 (DE) .......................... 102019113629.6

(51) Int. Cl.
*A61H 1/00* (2006.01)
*A61H 9/00* (2006.01)
(Continued)

(52) U.S. Cl.
CPC ........... *A61H 1/005* (2013.01); *A61H 9/0078* (2013.01); *A61H 23/004* (2013.01);
(Continued)

(58) Field of Classification Search
CPC .... A61H 1/005; A61H 9/0078; A61H 23/004; A61H 23/0218; A61H 23/04;
(Continued)

(56) References Cited

U.S. PATENT DOCUMENTS 5,135,282 A * 8/1992 Pappers ............... A61H 9/0078
297/284.6
5,155,685 A 10/1992 Kishi et al.
(Continued)

FOREIGN PATENT DOCUMENTS

CN 207657661 U 7/2018
DE 10063478 A1 7/2002
(Continued)

OTHER PUBLICATIONS

English translation of International Search Report for PCT/EP2020/058065 dated Jul. 31, 2020, 2 pages.
(Continued)

Primary Examiner — Mark R Wendell
(74) Attorney, Agent, or Firm — WARNER NORCROSS + JUDD LLP (57) ABSTRACT Air cushion assembly for a seat, such as a vehicle seat, comprising at least an air cushion and an air supply system for variably pressurizing the air cushions of the air cushion assembly with air. A respective supply line comprising a shut-off valve leads from the air supply system to each air cushion, where a pulsation module is provided and configured to act upon each air cushion with a pulsation. The pulsation module comprises a pneumatic element which is connected in a pressure-equalized manner to at least one supply line, and an actuating element for transmitting a mechanical motion to the pneumatic element for changing the volume of the pneumatic element in order to generate a pulsation.

18 Claims, 4 Drawing Sheets (51) Int. Cl.
*A61H 23/00* (2006.01)
*A61H 23/02* (2006.01)
*B60N 2/90* (2018.01)

(52) U.S. Cl.
CPC .......... *A61H 23/0218* (2013.01); *B60N 2/914* (2018.02); *B60N 2/976* (2018.02); *A61H 2201/0149* (2013.01); *A61H 2201/1207* (2013.01); *A61H 2201/1409* (2013.01); *A61H 2201/1654* (2013.01)

(58) Field of Classification Search
CPC .... A61H 2201/0149; A61H 2201/1207; A61H 2201/1409; A61H 2201/1654; A61H 2201/0134; B60N 2/976; B60N 2/914
USPC ...................................................... 297/284.6
See application file for complete search history.

(56) References Cited

U.S. PATENT DOCUMENTS

| | | | | |
|---|---|---|---|---|
| 6,273,810 | B1* | 8/2001 | Rhodes, Jr. ........... | A47C 27/083 297/452.47 |
| 10,086,720 | B2* | 10/2018 | Dankbaar ............... | B60N 2/976 |
| 2003/0038517 | A1* | 2/2003 | Moran ................... | B60N 2/914 297/284.6 |
| 2008/0296939 | A1* | 12/2008 | Bajic .................... | B60N 2/5642 297/180.1 |
| 2010/0289302 | A1 | 11/2010 | Cheng | |
| 2011/0068611 | A1 | 3/2011 | Maeda et al. | |
| 2016/0304009 | A1 | 10/2016 | Ogiso et al. | |
| 2018/0086238 | A1* | 3/2018 | Onuma ................. | B60N 2/976 |
| 2018/0370405 | A1 | 12/2018 | Klein | |

FOREIGN PATENT DOCUMENTS

| | | |
|---|---|---|
| DE | 102011079712 A1 | 1/2013 |
| DE | 112014005575 T5 | 8/2016 |
| EP | 3124320 A1 | 2/2017 |
| JP | 2005168953 A | 6/2005 |

OTHER PUBLICATIONS

Machine assisted English translation of DE10063478A1 obtained from https//patents.google.com/patent on May 20, 2020, 7 pages.
Machine assisted English translation of JP2005168953A obtained from https://patents.google.com/patent on Oct. 27, 2020, 6 pages.
Machine assisted English translation of DE102011079712A1 obtained from https://patents.google.com/patent on May 20, 2020, 8 pages.
Notification of First Office Action from the China National Intellectual Property Administration (with translation) in Application No. 202080037394.1, dated Feb. 8, 2023 (16 pages).

* cited by examiner

AIR CUSHION ARRANGEMENT FOR A SEAT, FOR EXAMPLE A VEHICLE SEAT

CROSS-REFERENCE TO RELATED APPLICATIONS

This application is the U.S. National Stage of International Application No. PCT/EP2020/058065 filed on 24 Mar. 2020, which claims priority to and all advantages of German Patent Application No. DE102019113629.3, filed on 22 May 2019, the content of which is hereby incorporated by reference.

FIELD OF THE INVENTION

The present invention relates to an air cushion assembly for a seat, such as a vehicle seat, as well as to a seat, such as a vehicle seat, comprising a corresponding air cushion assembly.

BACKGROUND

Air cushion assemblies for vehicle seats and also other seats, such as massage chairs, are sufficiently known from prior art.

DE 10 2011 079 712 A1 very generally discloses a pneumatic device for generating and transmitting pressure vibrations to the human body by way of an air cushion. A pressure generator, comprising a magnetic vibrating diaphragm pump, is provided there which can build up a vibration or pulsation by changing the pressure conditions in the air cushion and thereby transmitting it to the person. A throttle valve is provided for creating a slight vibration of the pressure level and causes a cyclical pulsation of the pressure profile in the pressure line of the air cushion by releasing air, for example, at a regular frequency.

Also known from prior art are vehicle seats with massage functions in which the respective air cushions of the seat equipped with the massage function are alternately pressurized with air and vented (at least in part), where a corresponding either central or separate air supply can be provided for each air cushion.

However, the mechanical systems described are comparatively sluggish and therefore allow only relatively low frequencies which can be uncomfortable for people or the actual massage effect is not sufficiently realized.

BRIEF SUMMARY

The air cushion assembly according to the invention for a seat, such as a vehicle seat, comprises at least an air cushion and an air supply system for variably pressurizing the air cushions of the air cushion assembly with air, where a respective supply line comprising a shut-off valve leads from the air supply system to each air cushion, where a pulsation module is provided and configured to act upon each air cushion with a pulsation, where the pulsation module comprises a pneumatic element which is connected in a pressure-equalized manner to at least one supply line and an actuating element for transmitting a mechanical motion to the pneumatic element for changing the volume of the pneumatic element in order to generate a pulsation.

It is provided according to the invention in particular that the pulsation module is provided separately from the actual air supply system. This can be implemented, for example, in that, firstly, an inlet for the air introduced via the air supply system and therefore a connection to the shut-off valve is provided in the supply line, and a second inlet is provided independently of this inlet and is connected in a pressure-equalized manner to the pneumatic element of the pulsation module. A further outlet then leads to the respective air cushion.

The pressure-equalized connection of the pneumatic element to the supply line is presently to be understood such that the same pressure which also prevails in the supply line always arises in the pneumatic element when the actuating element is in an inactive position (in which no or minimal mechanical force acts upon the pneumatic element) If the actuating element is actuated, this leads to a pressure change in the pneumatic element which is then also transferred to the supply line due to the pressure-equalized connection of the pneumatic element to the supply line.

In principle, the pneumatic element as such is provided as an element that can receive a volume of air, for example, in a substantially completely enclosed interior volume of the pneumatic element. Furthermore, the pulsation module is configured such that the actuating element and the pneumatic element can interact such that the amount of air in the pneumatic element can be changed, for example, can be changed periodically.

For this purpose, the mechanical motion of the actuating element preferably causes a change in the shape and/or the volume of the pneumatic element.

This air cushion assembly also allows for high-frequency vibrations (in the context of the invention this means: >1 Hz, preferably 3-100 Hz, more preferably 60-80 Hz) and at the same time no longer requires the use of the air supply system with the respective shut-off valves for generating the pulsation, so that a pulsation can be reliably generated even with constant pressure conditions in the supply line or a constant air volume in the supply line when the valves are shut off.

It can be provided that each pneumatic element is connected to exactly one supply line. With this embodiment, variable control of the pulsation is implemented and can be provided separately for each air cushion.

Furthermore, the actuating element can actuate the pneumatic elements independently of one another. This also allows for different frequencies and/or phases and/or amplitudes of the pulsations that are transmitted to the individual air cushions.

In one embodiment, the pneumatic element comprises an air cushion. The air cushion of the pneumatic element can also be referred to as a pneumatic cushion. It is a further air cushion and not the air cushion that is connected to the pneumatic element via the supply line. Air cushions can be manufactured inexpensively and have a long service life, even with high-frequency loads.

An independent actuating element can be associated with each pneumatic element. This also ensures that the individual actuation arguments can also be controlled mechanically independently of one another.

It can be provided that the pneumatic element comprises an air cushion with an interior volume that is connected to the supply line in a pressure-equalized manner, and the actuating element is configured to change the interior volume of the air cushion by mechanical action for acting upon the air cushion with a pulsation; or it can be provided that the pneumatic element is formed from a flexible diaphragm and the actuating element as well as a working space, where the flexible diaphragm, the actuating element, and the working space jointly define an interior volume of the pneumatic element which is connected to the supply line in a pressure-equalized manner, and where the actuating element is configured to change the interior volume by a mechanical motion for acting upon the air cushion with a pulsation.

In the first alternative, the air cushion is compressed and/or deformed, for example, by the action of the actuating element, so that a portion of the air in the air cushion is additionally pressed into the supply line, since the volume that is available changes or decreases, respectively. This can cause the pulsation. In the second alternative, the actuating element is part of the pneumatic element, which effects the direct transmission of the mechanical motion of the pneumatic element to a pressure change in the overall system. Both embodiments allow for high-frequency pulsations in the air cushion of the air cushion assembly.

The actuating element can be configured to actuate several pneumatic elements in an inversely phased manner. An inversely phased pulsation in the individual pneumatic elements can have a more pleasant effect on a passenger, for example, when performing a massage function with the air cushion assembly.

It can be provided that the actuating element comprises a pivot arm which can be pivoted by an angle about an axis, where at least one pneumatic element is arranged on oppositely disposed sides of the pivot arm; or that the actuating element is arranged so as to be linearly movable along an actuating stretch, where at least one pneumatic element each is arranged on oppositely disposed sides of the actuating element. This implementation of the actuating element is mechanically robust so that malfunctions rarely occur.

It is provided in one embodiment that the pulsation module comprises a cylinder, in the interior of which pneumatic elements are arranged concentrically with an interior volume connected to the supply line in a pressure-equalized manner, where the actuating element comprises a roller within the cylinder arranged eccentrically relative to the cylinder, where the pneumatic elements and the actuating element are arranged such that an eccentric motion of the roller about the longitudinal axis of the cylinder can change the interior volume of the pneumatic elements for acting upon the air cushion with a pulsation.

It is possible with this embodiment to periodically actuate the pneumatic elements offset from one another (i.e. with a time delay), and at the same time be able to reduce the number of actuating elements required.

In a further development of this embodiment, a contact surface between the roller and the pneumatic elements has a lubricant applied to it and/or the pneumatic elements consist of TPU film or the contact surface to the roller comprises TPU film. This configuration improves the average service life of the entire assembly.

It can be provided that a seam of the pneumatic elements forms an angle with the axis of the cylinder and/or the axis of rotation of the roller. This embodiment as well increases the longevity of the assembly.

The roller can preferably be connected by way of a gear to a drive element. A periodic motion of the drive element can then be transformed into a suitable, possibly lower or even higher motion frequency of the roller.

It is provided in a further development that the drive element is an electric motor and where a control unit is provided which can actuate the electric motor to control a rotational frequency of the electric motor. This embodiment is particularly advantageous for use in vehicles.

It can be provided that the air cushion assembly comprises a drive element for the actuating element, where the drive element is formed to cause a pulsation having a frequency of 1 Hz to 1000 Hz or 3 Hz to 100 Hz or 60 Hz to 80 Hz or between 5 and 20 Hz, in particular between 5 and 15 Hz, particularly preferably between 7 and 12 Hz; and/or the air cushion assembly is formed to implement a massage function and/or an entertainment function and/or a line assist function and/or a lane change warning function.

The pulsation frequencies provided according to this embodiment have a pleasant effect on people, in particular when realizing massage functions. The use of the air cushion assembly for the formation of a massage function and the other functions mentioned in this embodiment can be implemented in a manner that is pleasant for people, since the additional pulsation exerts a pressure effect on the human body that is not annoying even during long journeys.

According to the invention, a seat, for example a vehicle seat, comprising an air cushion assembly according to one of the preceding embodiments and optionally a lumbar support system is furthermore provided. The implementation of the air cushion assemblies in a vehicle seat is a particularly preferred embodiment of the invention and allows for space-saving installation.

DETAILED DESCRIPTION

Figure 1A:
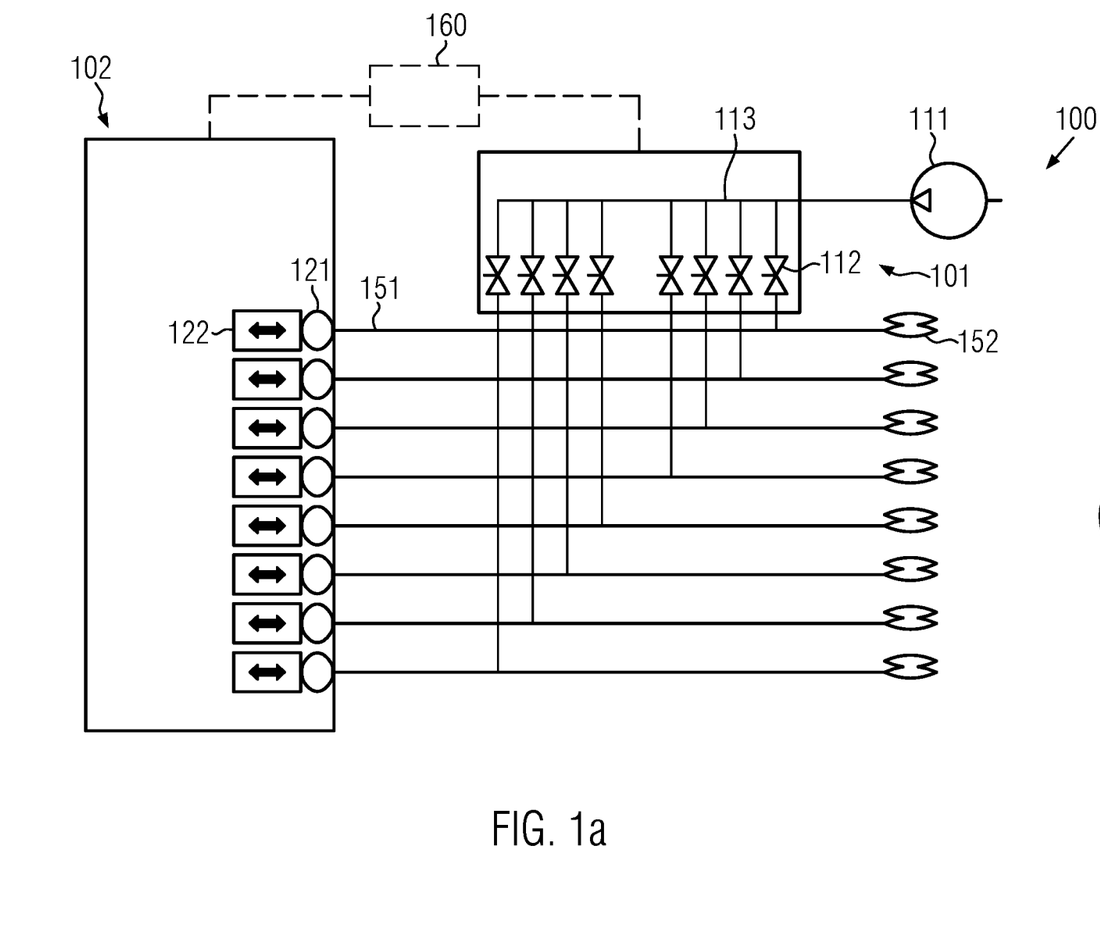
FIG. 1 shows a schematic representation of an air cushion assembly according to one embodiment
Figure 1B:
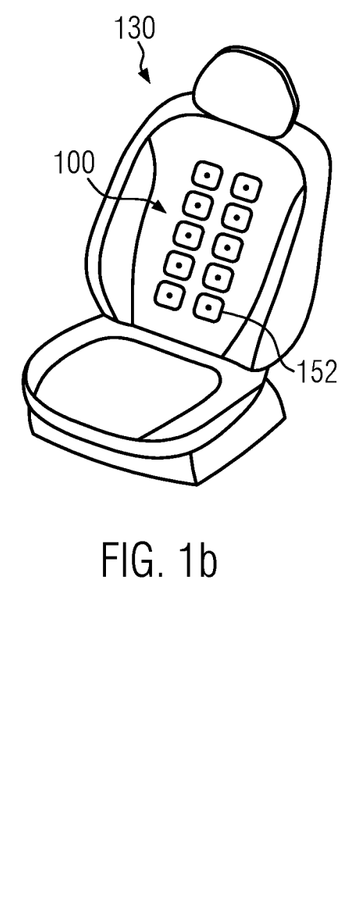

FIGS. 1a and b show schematic representations of an embodiment of air cushion assembly 100 according to the invention. Air cushion assembly 100 is shown schematically in the view illustrated in FIG. 1. FIG. 1b shows schematically the installation of air cushion assembly 100 and individual air cushions 152 of the air cushion assembly in a seat 130, in particular a vehicle seat for a car or truck or similar vehicle.

Air cushion assembly 100 according to the invention is basically intended to pressurize one or more air cushions 152 of air cushion assembly 100 with air and additionally to realize a pulsation of respective air cushion 152. It is not necessary there for the air that has once been introduced into air cushion 152 to remain in air cushion 152 at a constant pressure (apart from the pulsation). It can also be provided that the air introduced into the air cushion is removed in part or entirely from the air cushion or fed back thereinto it over longer periods of time (the frequency of which is in particular longer than the pulsation).

In particular, pressurizing air cushion 152 with air does not necessarily have to take place periodically. Applications of the air cushion assembly, for example, to achieve a massage function, are conceivable. In this case, air cushion 152 is periodically pressurized with air and all of the air is released (completely or at least part) from the air cushion in order to cause a massage effect, for example, at individual points on the back or legs of the vehicle occupant or generally on the people seated on seat 130 according to FIG. 1b.

An air supply system 101 is provided for pressurizing air cushions 152 with air. This air supply system comprises, for example, a pressure supply 111 in the form of a pump, from which one or more lines 113 lead to shut-off valves 112. The invention is not restricted in terms of the configuration of the pump and, in particular, embodiments can be envisaged that already use pumps that are customary for massage seats in vehicles.

The shut-off valves in turn are each connected via a separate supply line 151 to an air cushion 152. This means in particular that a first shut-off valve 112 is connected to a first supply line 151 and this supply line 151 leads to precisely one air cushion 152. A second shut-off valve is then connected to a second supply line and thereby to a second air cushion. This allows individual air cushions 152 to be pressurized independently with air by suitable actuation of the shut-off valves, for example, by way of control unit 160 that is only shown schematically (for example, the on-board computer of the vehicle). It can thus be realized, for example, that some of the air cushions provided (if more than one is provided) are pressurized with air in that the shut-off valves are opened and air is introduced into these valves via pressure supply 111, while the remaining shut-off valves remain closed and no air is introduced into the air cushions associated with these shut-off valves.

Various functions can then be realized in a selective manner. For example, the massage function mentioned above can be realized in that the individual air cushions are also pressurized with air at different frequencies or in opposite directions or alternately. Certain entertainment functions, such as the support of acoustic effects, such as music or films, can be effected in this way by the selective pressurization of one or more air cushions with air. As an alternative or in addition, it can also be provided that assistance systems of a vehicle are realized by pressurizing the air cushions with air or releasing the air. For example, a line assist function and/or a lane change warning function can be implemented by the air cushion assembly. For example, when changing lanes from the right-hand lane to the left-hand one, a row of air cushions mounted on the seat that in the vehicle direction is on the left-hand side can be pressurized with air in order to warn the driver that a lane change is imminent. The air cushions mounted in the direction of travel on the right-hand side can then remain empty, i.e. not be pressurized with air.

In principle, air cushions arranged at the side in the seat (for example at the side in the region of the backrest and/or the seat base and/or in the side walls of the seat base and/or the side walls of the backrest) could be equipped with a respective pulsation module. Air cushions arranged in the side walls can also be used to adapt the contour of the seat to the body shape of the occupant by pressurizing the air cushions respectively arranged in the side walls with more or less air, depending on the body shape of the occupant, in order to provide lateral support to the occupant independently of his stature. The air cushions on these side walls can then not only allow for the adaptation to the body shape, but also implement other functions such as the massage, the lane change warning function, and the entertainment functions including pulsation.

Other functions that can utilize support from such a pressure effect on the body in order to provide the operator with certain information can also be implemented by the air cushion assembly. The invention is therefore not restricted in this regard, although the use in vehicles as part of a vehicle seat and in particular the use as part of a massage device in the vehicle seat is preferred.

The above additional functions can not only be effected by pressurizing the air cushions and releasing the air therefrom. As an alternative or in addition, the pulsation provided according to the invention can also be used for this purpose.

According to the invention, the air cushion assembly further comprises a pulsation module 102. This pulsation module is structurally independent and possibly also provided separately from the air supply system and there in particular from shut-off valves 112. This means in particular that the pulsation module is not integrated into the shut-off valves or pressure supply 111.

It is provided in particular that the shut-off valve is connected via supply line 151 to respective air cushion 152. Pulsation module 102 is therefore connected to air cushions 152 such that it is arranged in the direction of air flow from pressure supply 111 to air cushions 152 at least downstream of shut-off valves 112.

According to the invention, pulsation module 102 comprises at least one pneumatic element 121. This pneumatic element 121 is to be understood to be an element that can contain a variable volume of air. This can be, for example, an air cushion that is compressible.

According to the invention, pneumatic element 121 is connected to supply line 151 in a pressure-equalized manner and therefore also to air cushion 152 in a pressure-equalized manner This means that the same pressure conditions always establish in the pneumatic element, supply line 151, and air cushion 152, while a spatial variance of the pressure conditions due to information transmission, for example, in the form of a density wave, should not oppose this. The pressure-equalized connection of pneumatic element 121 to supply line 151 and air cushion 152 is basically to be understood such that the total amount of air that is present in the pneumatic element, supply line 151, and air cushion 152 remains constant when valve 112 is shut off.

Furthermore, pulsation module 102 comprises an actuating element 122. This actuating element is configured such that it can act upon pneumatic element 121 by way of a mechanical motion in order to bring about a change in the volume of the pneumatic element. As described above, a pressure-equalized connection exists between pneumatic element 121, supply line 151, and air cushion 152. If the volume of pneumatic element 121 is now changed, then, with a constant amount of air in the system (with valve 112 being shut off), this leads to the pressure within the system changing. This can lead, for example, to a further expansion of air cushion 152 (pressure increase) or also to a reduction in the volume of air cushion 152 or the pressure acting therein, respectively.

Periodic actuation of the actuating element leads to a periodic pulsation of air cushion 152. The pressure information that transmits the change in the volume of pneumatic element 121 due to the actuation of actuating element 122 in the system comprising the pneumatic element, supply line 151 and air cushion 152, moves at a speed that is less than or at most equal to the speed of sound, which in the case of the dimensions of a seat causes a substantially instantaneous transmission of this pressure information and therefore also a corresponding change in the pressure conditions in air cushion 152, so that this pulsation can occur very quickly and the system is less sluggish overall.

In the embodiment shown in FIG. 1*a*, one pneumatic element 121 each is connected to exactly one supply line 151 and via the latter to exactly one air cushion 152. This is a particularly preferred embodiment, but it is not mandatory. For example, it can also be provided that a single pneumatic element 121 is provided for a plurality of air cushions 152.

This can be particularly advantageous if this plurality of air cushions is always pressurized with air as groups of air cushions or is not pressurized with air, since then the same pressure conditions always prevail in all air cushions and these air cushions can be acted upon with a pulsation.

In addition, it is shown schematically in FIG. 1 that one actuating element 122 each is associated with exactly one pneumatic element 121. Firstly, this already represents two separate embodiments. On the one hand, it can be provided that each of these separate actuating elements 122 can be actuated completely independently of the other actuating elements, for example, with the aid of control unit 160, in order to possibly cause a pulsation in the associated air cushion. In this case, it is possible to coordinate the different phases of the vibrations or pulsations, respectively, with one another (in that different air cushions are acted upon with a pulsation of different phases) such that undesired vibrations in the vehicle seat, which could result from reaching a resonance frequency, are prevented. As an alternative, it can also be provided that, although separate actuating elements 122 are provided for the individual pneumatic elements 121, actuating elements 122 are all set in motion with the same phase in order to bring about the pulsation. This can be used advantageously if the air cushions and in particular the pneumatic elements and the actuating elements are distributed at different points of the seat, so that a decentralized system can be implemented in which the line distances via the supply lines 151 at least between the respective pneumatic element 121 and the associated air cushion 152 are as short as possible, but the pulsation occurs simultaneously in all air cushions. Even if the pressure information propagates in the system at the speed of sound, as described above, lines of different lengths can nevertheless cause a slight delay that may be uncomfortable for the operator, which can be prevented with this embodiment.

As an alternative to the embodiments just described, however, it can also be provided that a row of pneumatic elements 121 is actuated by a single actuating element 122. As shall be described later, this does not require that all pneumatic elements of the row of pneumatic elements be actuated simultaneously and with the same phase. Alternating actuation of the pneumatic elements by the one actuating element is also conceivable there.

It can also be provided in one embodiment that a single actuating element is provided for all pneumatic elements of the air cushion assembly.

FIG. 2 shows a more detailed view of a pulsation module like already described in FIG. 1. In the embodiment presently shown, the pulsation module only comprises a pneumatic element and an actuating element, although the invention is not restricted in this regard, as already described with reference to FIG. 1. In particular, it is not necessary that there is a 1:1 association of one pneumatic element and one actuating element, but one actuating element can also actuate several pneumatic elements.

Figure 2A:
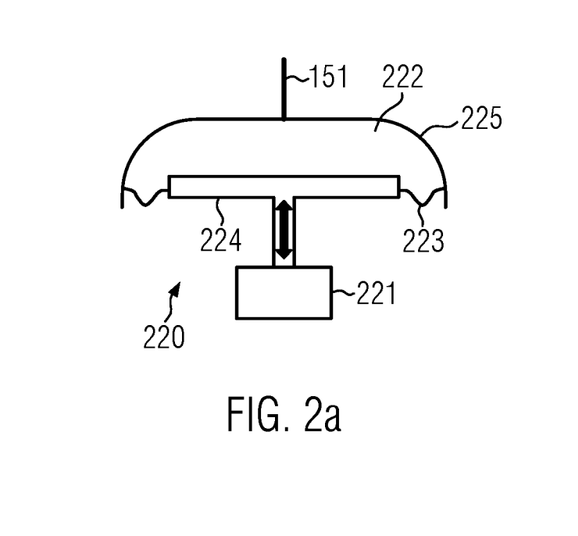
FIGS. 2a-c show different embodiments of the implementation of the actuating element

It is provided in the embodiment of pulsation module 220 shown in FIG. 2a that the pneumatic element is formed in part by actuating element 224. The actuating element is presently configured, for example, as a punch which is movable by drive 221 (for example an electric motor, in particular a servomotor) in the direction of the arrow shown. Actuating element 224 is moved within a volume 222 defined in part by a boundary surface (also referred to as work space) 225 of the pneumatic element. Furthermore, interior volume 222 of the pneumatic element formed in this manner is defined by a (preferably) flexible diaphragm 223. This creates an interior volume 222 which is closed off from the outside and which is connected to supply line 151 in a pressure-equalized manner in the sense of FIG. 1.

If actuating element 224 is now moved by drive 221, then interior volume 222 changes (for example periodically). The resulting change in the pressure of the air within interior volume 222 is then transmitted via supply line 151 to air cushion 152 (not shown in FIG. 2a), whereby a pulsation in air cushion 152 can be caused. According to this embodiment but also according to all other embodiments described, frequencies between 1 Hz and 1,000 Hz can be preferred there. For a massage function or similar functions of a vehicle seat, vibrations between 3 Hz and 100 Hz, in particular between 60 Hz and 80 Hz, and particularly preferably around 70 Hz or between 5 and 20 Hz, in particular between 5 and 15 Hz, particularly preferably between 7 and 12 Hz, have shown to be particularly pleasant for a person, so that even long-term use of a respective function does not appear unpleasant for people.

Figure 2B:
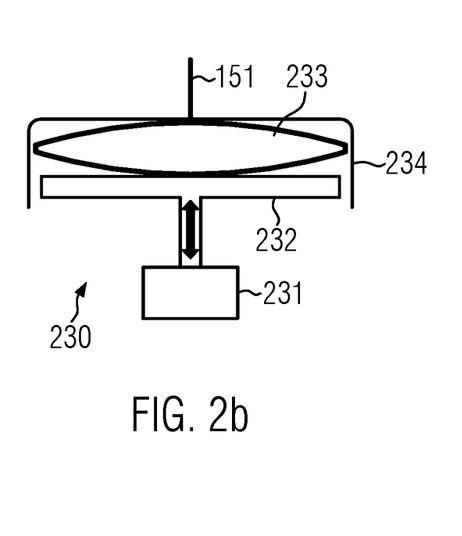

FIG. 2b shows a further embodiment of a pulsation module 230 which differs from FIG. 2a substantially in that pneumatic element 233 is formed entirely by an air cushion (also referred to as a pneumatic cushion) which has an interior volume and has a flexible outer shape which can be changed by actuating element 232, for example, by squeezing or compressing pneumatic element 233 that is configured as an air cushion.

In order to prevent the air cushion from escaping from the mechanical motions of actuating element 232, it can be provided that air cushion 233 is arranged in a frame 234 or in a holder and is also possibly mechanically connected thereto (e.g. by adhesive bonding), so that a guided motion of actuating element 232 and air cushion 233 can preferably be effected which takes place only within frame 234, so that the changes in the volume of air cushion 233 caused by actuating element 232 can be completely converted into pressure information or pulsation that can be transmitted through supply line 151. This embodiment offers the advantage that only the air cushion acts as a pneumatic element and the actuating element is completely independent thereof, in particular is not provided as part forming the interior volume.

While flexible diaphragm 223 in FIG. 2a therefore ensures a reliable seal of interior volume 222 also when the actuating element is moved, the motion of the actuating element no longer needs to be additionally sealed off from the environment.

Figure 2C:
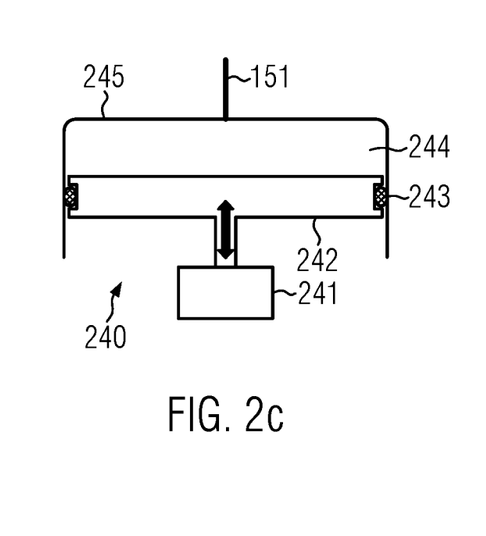

FIG. 2c shows a further embodiment of a pulsation module 240. Compared to FIG. 2a, a sealing arrangement 243 is provided in the embodiment shown there instead of flexible diaphragm 223 and together with actuating element 242 and housing 245 encloses an interior volume 244. There as well, interior volume 244 can then be changed by the motion of the actuating element 242 by way of drive 241 for supplying the corresponding pulsation via supply line 151 to a downstream air cushion.

This embodiment provides the advantage that interior volume 244 of the pneumatic element is defined practically entirely by mechanically incompressible elements (actuating element 242 and housing 245). The sealing element or sealing assembly 243, respectively, can be made of, for example, comparatively hard rubber. As a result, the volume available is not exposed to "wear and tear" even over long periods of operation, as would be the case with the air cushion and flexible diaphragm 223. They can be subject to material fatigue, which can make their use for effecting the pulsation over long periods of operation or lifetimes more difficult or more susceptible to failure.

Figure 3:
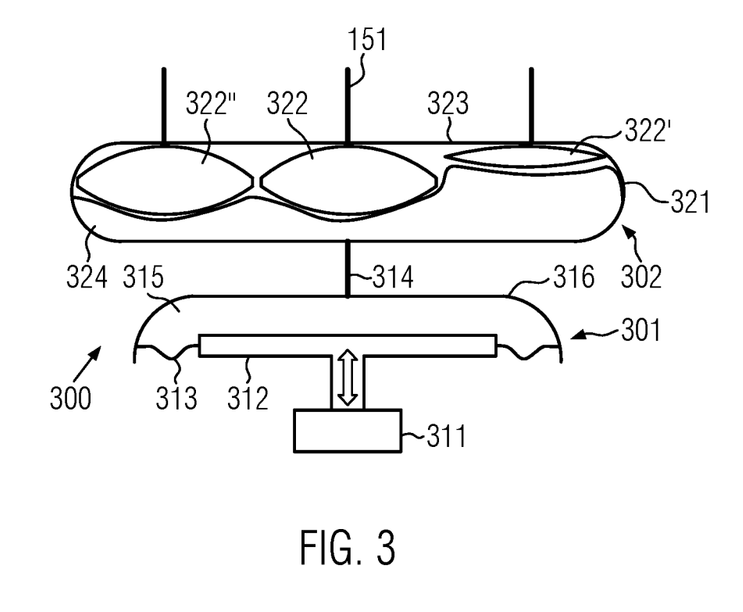
FIG. 3 shows a further embodiment of the actuating element

FIG. 3 shows a further embodiment in which the motion of the actuating element (i.e. the mechanical actuation) is decoupled from the pneumatic elements.

For this purpose, it is provided that one or more pneumatic elements 322 (such as in the form of air cushions) are arranged in a space region that is defined, on the one hand, by a housing or other suitable delimitation 323 and, on the other hand, by a flexible diaphragm 321. Like in the preceding embodiments, the air cushions are in turn each preferably connected by supply lines 151 to exactly one air cushion of the air cushion assembly.

The region formed on the oppositely disposed side of flexible diaphragm 321 is connected via a line 314 to a further air volume 301. This air volume, which forms in the region between flexible diaphragm 321, line 314, and region 315, is preferably constant and, above all, not connected to the air supply system of the air cushion assembly. Analogously to FIG. 2a, region 315 is defined, on the one hand, by actuating element 312 and drive 311 associated therewith, as well as by a flexible diaphragm 313 and a housing 316.

If actuating element 312 is now actuated, then this leads to the pressure within regions 315 and 324 as well as line 314 to change, since the volume that is available changes. This acts via the flexible diaphragm on air cushions 322 which deform accordingly and transmits a pulsation (with a pulsed motion of the actuating element) to the air cushions with which they are connected to via supply line 151. This embodiment can be employed particularly advantageously for using a single actuating element to actuate several pneumatic elements. As presently shown, pneumatic elements 322 and 322" are filled with air, i.e. corresponding supply lines 151 have also been pressurized. Air cushion 322' is flattened, in particular shown empty of air, since no compressed air has been introduced into the associated supply line. Even when the actuating element is actuated, it can be ensured in this manner that no undesired pulsation is caused in the air cushion associated with air cushion 322' at the other end of the associated supply line. Despite a single actuating element for a group of pneumatic elements, it can be ensured in this way that nevertheless only the air cushions or air cushion assemblies pressurized with air are acted upon with a pulsation.

It can also be provided in an alternative embodiment in accordance with FIG. 2b that several air cushions are arranged in housing 234. A "pressureless" air cushion, such as air cushion 322', any pressure information is then also not transmitted to the associated air cushion of the air cushion assembly also through the mechanical stroke of the actuating element. In order to further ensure this, it can be provided that the motion of the actuating element in such a case is adjusted in terms of its amplitude such that the actuating element does not touch a pressureless air cushion, so that even a portion of "residual air" remaining in the pneumatic element does not cause undesirable pulsation in the associated air cushion.

Figure 4:
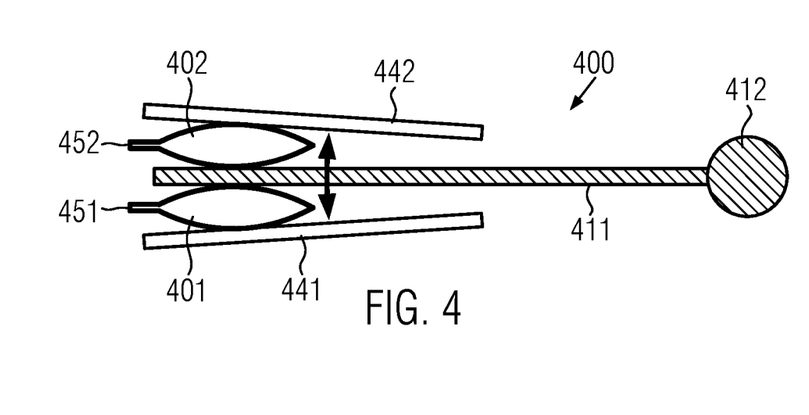
FIG. 4 shows an embodiment of the actuating element as a pivot arm

FIG. 4 shows a further embodiment of an actuating element 400, where the actuating element in this embodiment is configured as a pivot arm 411 which can be pivoted about an axis 412.

Two air cushions 401 and 402 are provided in the embodiment shown there, where first air cushion 401 is arranged on one side of the pivot arm and second air cushion 402 is arranged on the opposite side of the pivot arm. Furthermore, counter-pressure elements 441 and 442 are provided such that the air cushions are each arranged between pivot arm 411 and the counter-pressure element associated therewith, which stabilizes the position of the air cushions. This ensures that the mechanical information transmitted to the air cushion is converted as completely as possible into pressure information that can be transported as pulsation through respective supply lines 451 and 452.

It is now provided in the embodiment shown there that the actuating element in the form of pivot arm 411 is pivoted about axis 412 in the double arrow direction shown. As a result, one air cushion 401 is alternately unloaded of pressure and other air cushion 402 is loaded, or vice versa, which causes an antiphase load on air cushions 401 and 402, with the result that the pulsation also runs through supply lines 451 and 452 in an exactly antiphase manner. This is particularly advantageous for avoiding resonances in the air cushion assembly which can possibly have an unpleasant effect on people.

While only one air cushion is arranged on each side of pivot arm 411 in the embodiment shown there, several air cushions can also be arranged (in a direction perpendicular to the plane of the drawing in FIG. 4) so that, for example, different groups of air cushions can be operated in an antiphase manner. Here as well, it can be provided that pressureless air cushions are either not touched by the pivot arm 411 or at least no pressure information is transmitted to the associated air cushions of the air cushion assembly, so that it is also possible to switch off (release the air) separate air cushions without pulsation being caused in them.

In addition, there is no need for pivoting. In some embodiments, it can also be provided instead of the pivot arm that the actuating element is linearly movable, where pneumatic elements can then be arranged on oppositely disposed sides of the actuating element (for example also using respective counter-pressure elements 441 and 442) such that the motion of the actuating element in analogy to above FIG. 4 alternately causes one pneumatic element to be loaded and the other pneumatic element to be unloaded, so as to cause pulsation in the air cushion or in the air cushions, respectively, associated with the pneumatic elements during a (periodic or repeated) motion of the actuating element.

Figure 5:
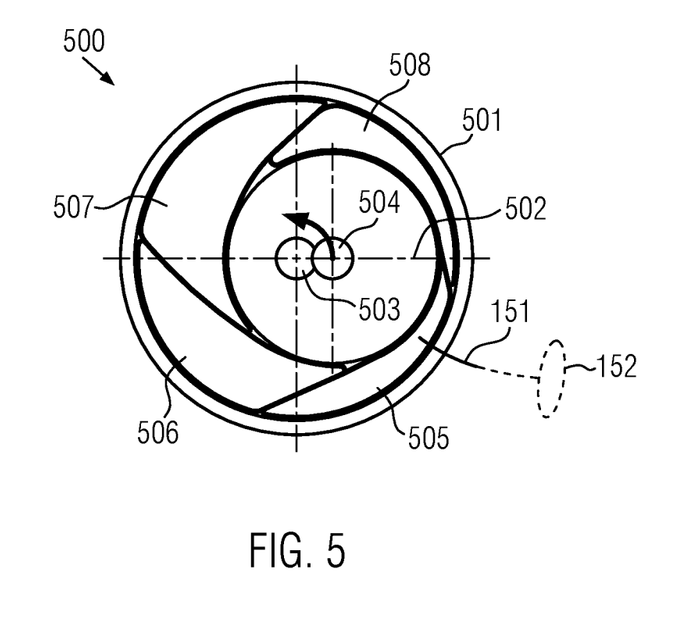
FIG. 5 shows a further embodiment of the actuating element

FIG. 5 shows a further embodiment of the invention, where pulsation module 500 in this embodiment is configured as a cylinder which is presently shown only in a cross-sectional view, where the image plane of FIG. 5 runs perpendicular to the longitudinal axis of the cylinder.

A row of air cushions 505 to 508 in the embodiment presently shown is arranged on the inner wall of an outer defining cylinder 501. This can be implemented, for example, by adhesively bonding the air cushions or some other mechanical attachment, such as screwing or clamping, as long as it is ensured that the air cushions are closed in an airtight manner. Each of the air cushions (shown by way of the example of air cushion 505) is connected to an air cushion 152 of the air cushion assembly via a corresponding supply line 151 leading out of outer defining cylinder 501.

Air cushions 505 to 508 preferably have the same shape and/or the same volume.

Furthermore, an actuating element 502 is arranged in outer defining cylinder 501 and is implemented in this embodiment as a roller that is arranged eccentrically to the longitudinal axis of outer defining cylinder 501 and that extends at least along a portion of the total length (perpendicular to the image plane) of outer defining cylinder 501.

It can be provided that the roller either has a cylindrical shape or has (slight) deviations from the cylindrical shape. In particular, deviations can be provided on the base surface and the top surface of the roller (corresponding to the base surfaces and top surfaces of outer defining cylinder 501, which for example, cause the roller to be beveled towards the base or top surface, respectively. For example, starting out from the center point of the roller, it can be provided that the radius of the roller reduces in the direction of the base or top surface, respectively. This can preferably be done in the form of a curve (such as a parabolic section) in order to prevent edges and thereby undesirable loads upon the air cushions.

In the embodiment presently shown, the roller rotates with its central axis 504 about central axis 503 of outer defining cylinder when the actuating element is in operation. Due to the eccentric arrangement of roller 504, this leads to air cushions 505 to 508 being deformed to different degrees when roller 502 rotates about axis 503, as can already be seen in FIG. 5. Air cushion 505 is severely deformed there, its volume being significantly smaller than that of air cushion 507. As a result, pressure information is again generated in the air cushions and can be transmitted as a pulsation (with repeated and/or periodic rotation of the roller) via supply line 151 to air cushions 152 of the air cushion assembly.

While the roller in the embodiment presently shown is arranged within the region in which the air cushions are arranged, it can also be provided that the air cushions are surrounded by an actuating element configured as a hollow roller in cylinder 501, where the air cushions are then, for example, fixedly connected to a physically formed axis 503 of defining cylinder 501 to affix their position. The roller then rotates eccentrically around the outside of the air cushion and thus causes the desired deformation for generating the pulsation.

While the roller in the embodiment shown in FIG. 5 comes into direct contact with the air cushions, it can also be provided that spacers are arranged on the surface of the air cushions facing roller 502, for example, in the form of rubber elements or generally resilient elements with which roller 502 interacts as it rotates to transmits a mechanical motion of the roller to a deformation of the air cushions. This reduces the wear on the surface of the air cushions.

In addition or as an alternative, it can be provided that the contact surface of the air cushions with the roller has a lubricant applied to it, such as lubricating grease, and/or that the pneumatic elements (in particular air cushions) are equipped with a TPU film on their contact surface so that friction with the cylinder is reduced. Both embodiments allow for a reduction in the physical load on the pneumatic elements, so that their longevity can advantageously be increased.

Furthermore, it can be provided that a seam of the air cushions is arranged such that the physical load acting upon the seam is as low as possible. Such a seam is provided to close the air cushion. The seam can be adhesively bonded, for example, by heating the material of which the air cushion is made and in part melting it. If the seam were to run perpendicular to the image plane shown in FIG. 5, i.e. parallel to axis 503 of defining cylinder 501, then this would mean that the air cushion is simultaneously loaded over its entire length along the seam by the motion along the roller. To avoid this, it can be provided that the seam, starting out from the upper end or the upper corner surface of the outer defining cylinder 501 in the direction of the lower defining surface of the outer defining cylinder, extends at least in part also in the circumferential direction so that it forms an angle with the axis of outer defining cylinder 501. This ensures that not the entire seam of the air cushion is loaded at the same time when roller 502 is rotated, but rather different regions of the seam are loaded at different rotational positions of the roller, which distributes the forces acting upon the air cushion and thereby achieves improved service life of the air cushion that is to be expected.

In order to enable this embodiment to be installed in a manner as space-saving as possible, for example, in a backrest of a vehicle seat, it can be provided that the expansion of the air cushions, the roller, and the outer defining cylinder in a direction perpendicular to the image plane is as small as possible, preferably not greater than 2 cm or not greater than 3 cm. In order to nevertheless ensure a sufficient volume for causing a pulsation, it can be provided that the inner diameter of the outer defining cylinder is at least 5 cm, preferably at least 7 cm, but preferably not more than 10 cm. The roller and the air cushions can then be sized according to the requirements, where the volume of the air cushions or general pneumatic elements also depends on the number of pneumatic elements provided.

In principle, an electric motor, in particular a servomotor, can be provided (not only in FIG. 5 or FIG. 2) as the drive for the actuating elements. However, since the frequency with which the pulsation is to be generated in the air cushions of the air cushion assembly can in part deviate from the rotational frequencies that are customary for servomotors, it can be provided that a connection of the drive to the actuating element is effected by way of a gear that realizes a certain transmission ratio.

Figure 6:
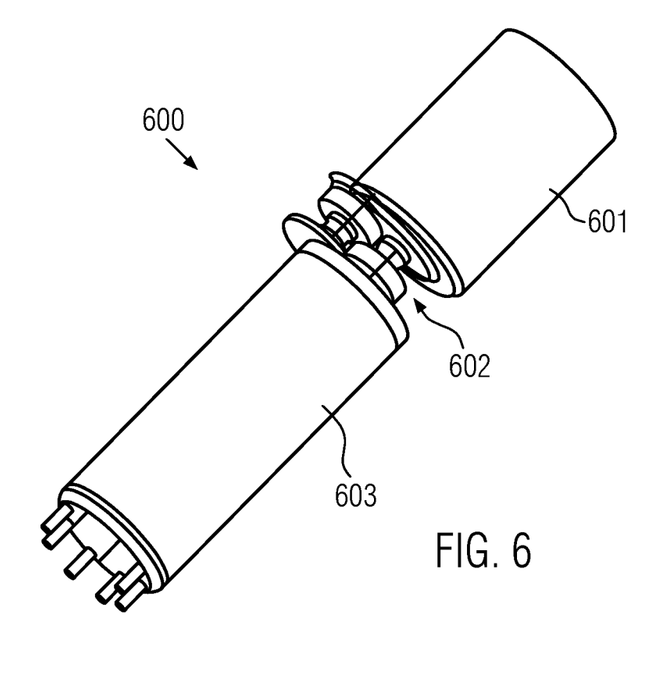
FIG. 6 shows an implementation of the gear between the drive motor and the pulsation element

Such an arrangement is shown schematically in FIG. 6. The drive motor is presently shown as drive motor 601 and can be configured, for example, as an electric motor or a servo motor. Disposed between this drive motor 601 and the pulsation element, in particular actuating element 603 (for example the roller from FIG. 5 or the actuating elements of FIGS. 2 to 4) can be a gear 602 which causes a certain transmission ratio of the rotational speed of the drive motor and the frequency of the actuating element. This transmission ratio can be set in dependence of the application. In principle, it is also conceivable that different transmission ratios can be implemented with one and the same gear, as is well known from transmissions in drive technology. The frequency of the pulsation can be set in this manner, which can be particularly advantageous in particular with regard to different fields of application of this pulsation effect (for example, massage function, on the one hand, support of an entertainment system, on the other hand). It can then be provided that the control unit is connected to the gear and can control the transmission ratio, for example, as a function of a desired or required pulsation frequency for certain applications.

While the air cushion assembly according to the invention has presently only been described in general, it can in particular be provided that this air cushion assembly is arranged in the region of a backrest of a vehicle seat and/or in the region of a seat base of a vehicle seat. In particular, a combination of this air cushion assembly with a lumbar support system, as is now often used in the automotive industry, can be implemented in a seat. The number of air cushions of the air supply system that exert a pressure effect on the body of the seated person is in principle arbitrary and can comprise approximately 10 or 20 air cushions. Any number of air cushions is conceivable there.

In particular, it is provided that the pulsation module and the air cushions of the air cushion assembly are installed in the seat. The air supply system, on the other hand, does not necessarily have to be arranged in the seat and can also be arranged, for example, in a vehicle floor. As an alternative, for example, the air cushion assembly can be arranged in the backrest of the seat, whereas the air supply system is arranged in the seat base.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. An air cushion assembly for a seat, said air cushion assembly comprising at least an air cushion and an air supply system for variably pressurizing said air cushion(s) of said air cushion assembly with air, where a respective supply line comprising a shut-off valve leads from said air supply system to each air cushion, where a pulsation module is provided and configured to act upon each air cushion with a pulsation, where said pulsation module comprises a pneumatic element which is connected in a pressure-equalized manner to at least one supply line, and an actuating element for transmitting a mechanical motion to said pneumatic element for changing the volume of said pneumatic element in order to generate a pulsation.

2. An air cushion assembly according to claim 1, where each pneumatic element is connected to exactly one supply line.

3. An air cushion assembly according to claim 1, where said actuating element can actuate said pneumatic elements independently of one another.

4. An air cushion assembly according to claim 1, where said pneumatic element comprises an air cushion.

5. An air cushion assembly according to claim 1, where each pneumatic element is associated with an independent actuating element.

6. An air cushion assembly according to claim 5, where said pneumatic element comprises an air cushion with an interior volume which is connected to said supply line in a pressure-equalized manner, and said actuating element is adapted to change the interior volume of said air cushion by mechanical action for acting upon said air cushion with a pulsation; or
where said pneumatic element is formed from a flexible diaphragm and said actuating element as well as a working space, where said flexible diaphragm, said actuating element, and said working space jointly define an interior volume of said pneumatic element which is connected to said supply line in a pressure-equalized manner, and where said actuating element is configured to change said interior volume by a mechanical motion for acting upon said air cushion with a pulsation.

7. An air cushion assembly according to claim 1, where each actuating element is configured to actuate several pneumatic elements in an inversely phased manner.

8. An air cushion assembly according to claim 7, where said actuating element comprises a pivot arm which can be pivoted by an angle about an axis, where at least one pneumatic element each is arranged on oppositely disposed sides of said pivot arm; or
where said actuating element is arranged so as to be linearly movable along an actuating stretch, where at least one pneumatic element each is arranged on oppositely disposed sides of said actuating element.

9. An air cushion assembly according to claim 1, where said pulsation module comprises a cylinder, in the interior of which pneumatic elements are arranged concentrically with an interior volume connected to said supply line in a pressure-equalized manner, where said actuating element comprises a roller within said cylinder arranged eccentrically relative to said cylinder, where said pneumatic elements and said actuating element are arranged such that an eccentric motion of said roller about the longitudinal axis of said cylinder can change the interior volume of said pneumatic elements for acting upon said air cushion with a pulsation.

10. An air cushion assembly according to claim 9, where a contact surface between said roller and said pneumatic elements has a lubricant applied to it and/or said pneumatic elements consist of TPU film or said contact surface to said roller comprises TPU film.

11. An air cushion assembly according to claim 9, where a seam of said pneumatic elements forms an angle with the axis of said cylinder and/or the axis of rotation of said roller.

12. An air cushion assembly according to claim 9, where said roller is connected by way of a gear to a drive element.

13. An air cushion assembly according to claim 12, where said drive element is an electric motor and where a control unit is provided which can actuate said electric motor to control a rotational frequency of said electric motor.

14. An air cushion assembly according to claim 1, where:
said air cushion assembly comprises a drive element for said actuating element, where said drive element is formed to cause a pulsation having a frequency of 1 Hz to 1000 Hz; and/or
said air cushion assembly is configured to implement a massage function and/or an entertainment function and/or a line assist function and/or a lane change warning function.

15. A seat comprising the air cushion assembly according to claim 1.

16. The seat according to claim 15, further comprising a lumbar support system.

17. An air cushion assembly for a seat, said air cushion assembly comprising:
   at least an air cushion,
   an air supply system for variably pressurizing said air cushion(s) of said air cushion assembly with air,
   where a respective supply line leads from said air supply system to each air cushion, the respective supply line comprising a shut-off valve,
   the air cushion assembly further comprising a pulsation module, the pulsation module being provided and configured to act upon each air cushion with a pulsation,
   said pulsation module comprising:
   a pneumatic element, and
   an actuating element,
   the pneumatic element being connected in a pressure-equalized manner to at least one supply line, and
   the actuating element being arranged and configured for transmitting a mechanical motion to said pneumatic element for changing the volume of said pneumatic element in order to generate a pulsation.

18. The air cushion assembly of claim 17, wherein the pulsation module is provided separately from the air supply system.

* * * * *